US009432709B2

(12) United States Patent
Kudelski et al.

(10) Patent No.: US 9,432,709 B2
(45) Date of Patent: Aug. 30, 2016

(54) SYSTEM AND METHOD TO PREVENT MANIPULATION OF TRANSMITTED VIDEO DATA

(75) Inventors: André Kudelski, Lutry (CH); Christophe Nicolas, St. Prex (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 553 days.

(21) Appl. No.: 13/067,923

(22) Filed: Jul. 7, 2011

(65) Prior Publication Data

US 2012/0017235 A1 Jan. 19, 2012

Related U.S. Application Data

(60) Provisional application No. 61/364,834, filed on Jul. 16, 2010.

(30) Foreign Application Priority Data

Oct. 1, 2010 (EP) .................................... 10185371

(51) Int. Cl.

| | |
|---|---|
| ***H04N 7/173*** | (2011.01) |
| ***H04N 21/254*** | (2011.01) |
| ***H04N 21/4363*** | (2011.01) |
| ***H04N 21/4367*** | (2011.01) |
| ***H04N 21/835*** | (2011.01) |
| *H04N 7/167* | (2011.01) |

(52) U.S. Cl.

CPC ...... *H04N 21/2541* (2013.01); *H04N 21/4367* (2013.01); *H04N 21/43635* (2013.01); *H04N 21/43637* (2013.01); *H04N 21/835* (2013.01)

(58) Field of Classification Search

CPC .................. H04N 21/2541; H04N 21/43635; H04N 21/43637; H04N 21/4367; H04N 21/835

USPC ......... 380/42, 201, 202, 239, 228, 283, 272; 713/168; 725/44, 31

See application file for complete search history.

(56) References Cited

U.S. PATENT DOCUMENTS 5,241,599 A * 8/1993 Bellovin et al. .............. 713/171
7,257,228 B2 * 8/2007 Wheeler et al. .............. 380/255
7,490,350 B1 * 2/2009 Murotake ............... G06F 21/85 726/11

(Continued)

OTHER PUBLICATIONS

Hitachi et al., "High Definition Mulitmedia Interface Specification Version 1.1", Internet Citation May 20, 2004, URL: http://www.hdmi.org/download/HDMI_Specification_1.1.pdf (p. 96).

(Continued)

*Primary Examiner* — Pankaj Kumar
*Assistant Examiner* — Reuben M Brown
(74) *Attorney, Agent, or Firm* — Harness, Dickey & Pierce, P.L.C.

(57) ABSTRACT

Example embodiments relate to a system to prevent manipulation of transmitted video data including an Integrated Receiver Decoder (IRD) receiving audio/video data and a display device. The IRD may include a device to transmit an HDMI compliant audio/video stream toward the display device. The system may further include a device to add an over-encryption layer to the HDMI/HDCP stream before reaching the display device and a device to remove the added encryption layer so as to recover the HDMI/HDCP stream, before processing the HDMI/HDCP stream by the display device.

16 Claims, 2 Drawing Sheets

(56) References Cited

U.S. PATENT DOCUMENTS 7,593,469 B2 9/2009 Williams et al.
7,676,584 B2 * 3/2010 Klitsner .................. A63F 13/12 709/227
7,831,469 B2 * 11/2010 Bhakta .................. G06Q 30/02 705/14.1
7,853,121 B2 * 12/2010 Yahata .................. 386/252
8,281,359 B2 * 10/2012 Gagnon et al. .............. 725/141
2002/0126872 A1 * 9/2002 Brunk ............... G06K 9/00744 382/100
2003/0046388 A1 * 3/2003 Milliken .............. H04L 41/046 709/224
2003/0106072 A1 * 6/2003 Soundararajan ............. 725/151
2004/0032950 A1 * 2/2004 Graunke .................. 380/42
2005/0038998 A1 * 2/2005 Ueno et al. .................. 713/165
2006/0120295 A1 * 6/2006 Scholtens et al. ............ 370/248
2007/0025553 A1 * 2/2007 Beuque et al. ............... 380/263
2007/0028260 A1 2/2007 Williams et al.
2007/0028283 A1 2/2007 Williams et al.
2007/0083559 A1 * 4/2007 Harris et al. ............... 707/104.1
2008/0127312 A1 * 5/2008 Iwamoto et al. ................ 726/4
2008/0134237 A1 6/2008 Tu et al.
2008/0214175 A1 * 9/2008 Papadoglou et al. ...... 455/422.1
2008/0232588 A1 * 9/2008 Christison .................... 380/270
2008/0235140 A1 9/2008 Read
2010/0008504 A1 * 1/2010 Nagara ........... H04N 21/43632 380/243
2010/0023783 A1 * 1/2010 Ambady ...................... 713/193
2010/0064324 A1 * 3/2010 Jenkin et al. .................. 725/59
2010/0259678 A1 * 10/2010 Vantalon et al. ............ 348/553
2010/0269129 A1 * 10/2010 Lim ............................ 725/27
2010/0319066 A1 * 12/2010 Berry .......................... 726/20
2010/0322415 A1 * 12/2010 Gondkar et al. ............... 380/42
2011/0113235 A1 * 5/2011 Erickson ..................... 713/152
2011/0170688 A1 * 7/2011 Evans et al. ................. 380/210
2011/0208657 A1 * 8/2011 Rao ............................ 705/67
2011/0225620 A1 * 9/2011 Yeh ............................ 725/127
2012/0017235 A1 * 1/2012 Kudelski et al. ............... 725/31

OTHER PUBLICATIONS

Oogabada: “HDFury: la scorciatoia per l’accesso alla next-gen PS3” console-tribe.com, Sep. 14, 2007, (p. 4, Fig 1; p. 5, Fig 3; p. 8, Fig 1).
Elinor Mills: “intel: Leaked HDCP copy protection code is legit”, CNET, Sep. 16, 2010, (Whole Document).
European Seach Report.

* cited by examiner

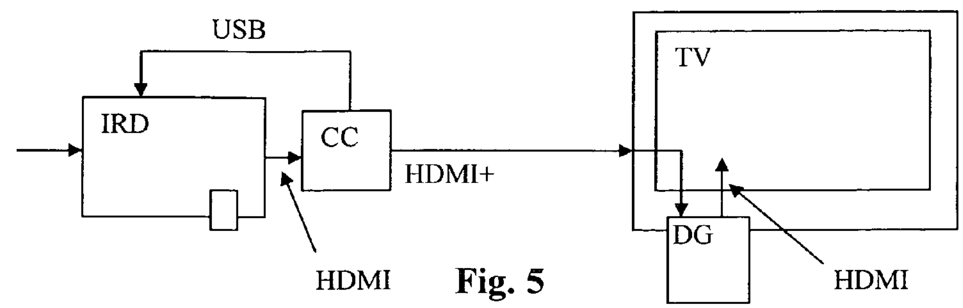
Fig. 5
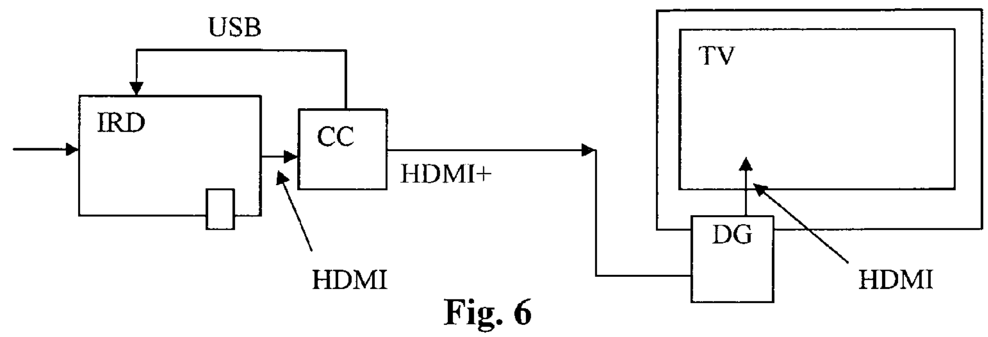
Fig. 6
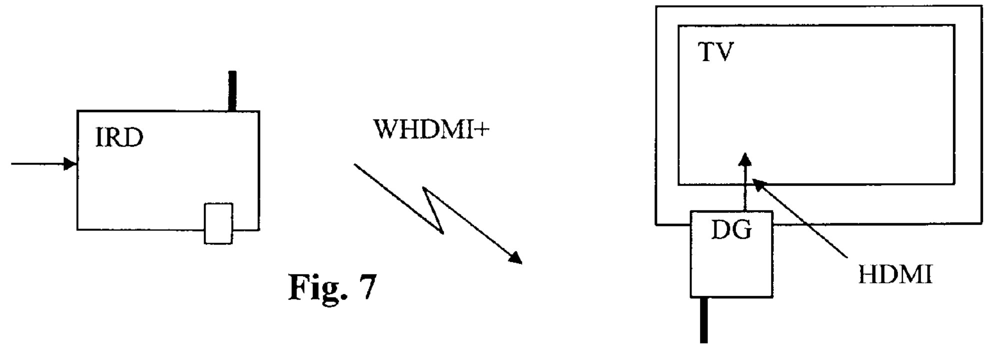
Fig. 7
Fig. 8
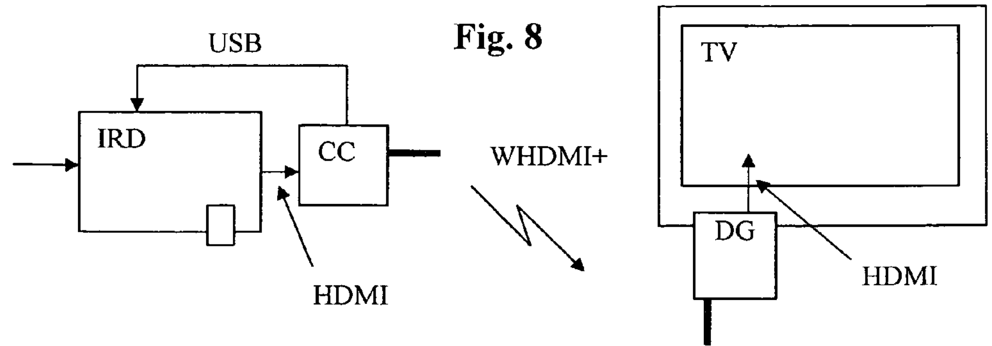

SYSTEM AND METHOD TO PREVENT MANIPULATION OF TRANSMITTED VIDEO DATA

This application claims the benefit of U.S. Provisional Application No. 61/364,834, filed Jul. 16, 2010 and European Patent Application No. 10185371.1 filed Oct. 1, 2010, the entire contents of which are hereby incorporated by reference.

INTRODUCTION

The present invention concerns the field of television devices, in particular a set-top-boxes (or IRD Integrated Receiver Decoder) designed to providing additional media experience on the television.

PRIOR ART

The today's situation is described in respect with the FIG. 1. The IRD is connected to the various sources of data (IP, satellite, cable, antenna) and is in charge of extending the capabilities of the television by providing decryption of the encrypted data as well as handling the access rights. The IRD proposes also storage capabilities, parental control with identification of the user to apply the proper profile and a program guide. The output is connected to a television or a screen to take advantage of the multimedia experience.

One of the revenue model of the media content providers is the advertisement introduced during appealing broadcast content. It is therefore important that the advertisements sent by the IRD to the television is not replaced by other information.

The document US 2008/0235140 discloses a dongle for digital rights management protection which includes a digital right management engine and an encryption/decryption engine. The digital rights management engine is adapted to port digital rights management rules of a source of content to digital rights management rules enforced by the digital rights management engine. The encryption/decryption engine is adapted to re-encrypting the source of content into a managed copy of the content and the managed copy of the content is locked to the dongle.

BRIEF DESCRIPTION OF THE INVENTION

The aim of the invention is to provide a solution to ensure that the content sent by the IRD is the content effectively displayed on the screen.

It is therefore proposed a system to prevent manipulation of transmitted video data comprising an Integrated Receiver Decoder IRD receiving audio/video data, a display device TV, said IRD comprising means to transmit an HDMI compliant audio/video stream toward the display device, characterized in that this system further comprises means to add an over-encryption layer to this HDMI/HDCP stream before reaching the display device and means to remove this added encryption layer so as to recover this HDMI/HDCP stream, before processing this HDMI/HDCP stream by said display device.

It is also proposed a decoder to prevent manipulation of transmitted video data comprising means for receiving audio/video data and means for transmitting an HDMI/HDCP stream resulting from an HDMI compliant audio/video stream protected by an HDCP protocol, characterized in that it comprises means to add an over-encryption layer to said HDMI/HDCP stream.

Finally, it is proposed a dongle DG for removing an over-encryption layer from an HDMI/HDCP stream resulting from an HDMI compliant audio/video stream protected by an HDCP protocol within a system for preventing manipulation of transmitted video data, comprising an input receiving said over-encrypted HDMI/HDCP stream, an output to connect said dongle to a display device TV and a port for sending an encryption key and a unique identifier for identifying the dongle DG.

BRIEF DESCRIPTION OF THE FIGURES

The present invention will be better understood thanks to the attached figures in which:

The FIG. 1 illustrates the standard known system.

Figure 2:
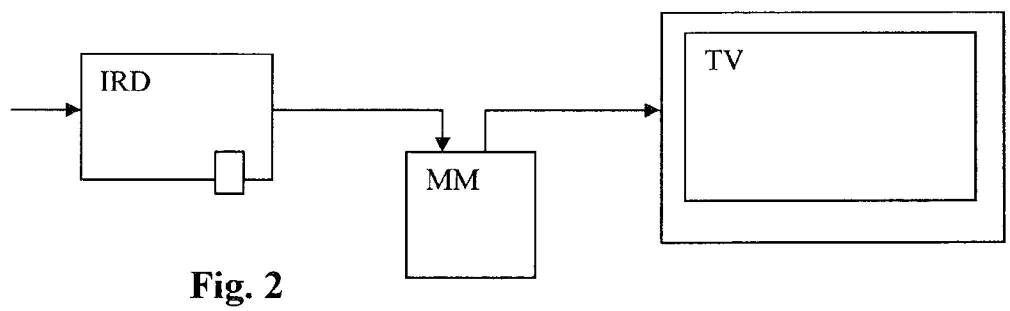

The FIG. 2 shows the so-called "man-in-the-middle" attack

Figure 3:
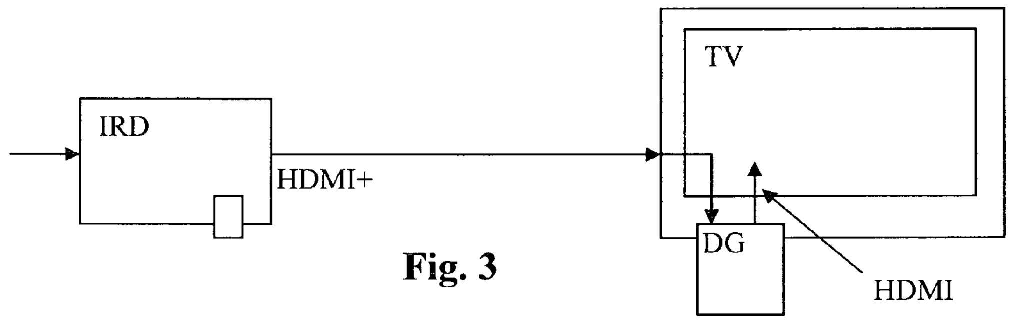

The FIG. 3 illustrates a first solution to address this problem

Figure 4:
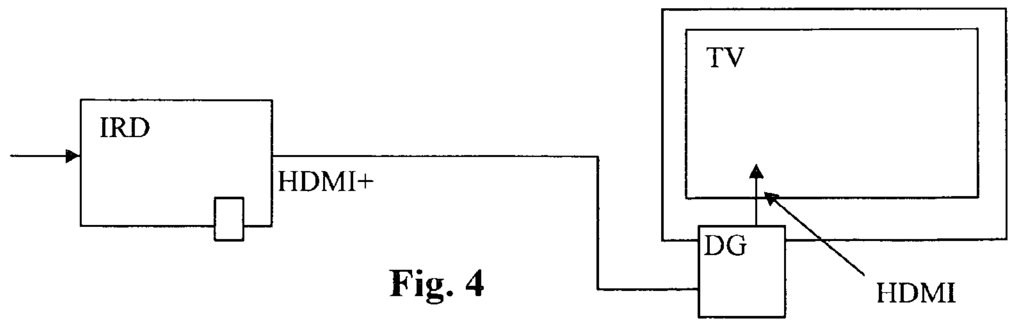

The FIG. 4 is similar to the FIG. 3 with the difference that the HMDI+ stream is directly connected to the dongle DG The FIG. 5 illustrates another embodiment of the invention The FIG. 6 illustrates a modification of the embodiment of the FIG. 5, in which the display device receives the HDMI+ stream and reroute it to the dongle The FIG. 7 is similar to the other designs with a wireless connection The FIG. 8 illustrates an embodiment in which the IRD comprises no wireless capabilities.

DESCRIPTION OF THE VARIOUS EMBODIMENTS

Figure 1:
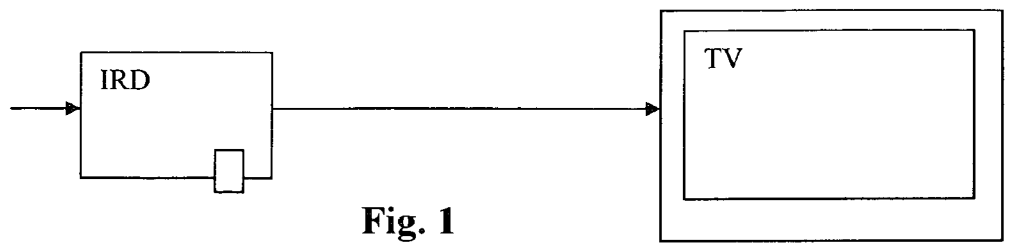

The FIG. 1 illustrates the standard known system. The IRD (Integrated Receiver Decoder) is on one side connected to the broadcast channels, such as via an antenna, cable, or IP, and on the other side is connected to a display device TV. The purpose of the IRD is to receive the signal, convert it into a plurality of channels, and if necessary, decrypt the selected channel with the cooperation of a security module. The selected channel is then transmitted to the TV via an HDMI cable. Other functions are also proposed by the IRD such as recording an event, either directly while it is broadcasted, or according to a programmed time/date.

The IRD is also in charge of the reception, preparation and display of the Electronic Program Guide (EPG) that helps the user to quickly access the desired channel.

The HDMI communication is protected by HDCP which defines the frame of data exchange. HDCP is based on certificates verification and data encryption. Before the data are outputted by a source device, a handshake is initiated during which the certificate of the source and the sink are exchanged. The received certificate (e.g. X509) is then verified and used to establish a common encryption key. The verification can use white or black lists. The known HDMI communication protected by HDCP adds an encryption layer to an unprotected HDMI stream. However, HDCP being a well known standard, an additional device can embed genuine HDCP certificates and can therefore receive the content sent by the IRD in view of manipulating said content.

Contrary to the prior art, it should be noted that the present invention does not attempt to decrypt the HDMI/HDCP stream in order to get the basic HDMI stream, namely an HDMI stream which is unprotected by the HDCP protocol.

The FIG. 2 shows the so-called “man-in-the-middle” attack in which an additional device MM is placed at the output of the IRD and intercepts the audio/video stream. The risk in such a case is to bypass the security rules that were associated with the content such as “view only”, “view once”, “no record”. The fact that the content is in an external device opens the possibility for a third party to use the content in a way not authorized by the content provider. Another aim of this patent application is to detect the presence of such external and in-between device by the IRD and take appropriate action.

The FIG. 3 illustrates a first solution to address this problem. The IRD outputs a modified HDMI/HDCP signal, called HDMI+ in which all or part of the payload (audio/video data) is protected by an encryption layer. The wording “layer” is used here under a figurative meaning (i.e. not literally) in order to illustrate that the encryption is applied to the HDMI/HDCP signal (i.e. to the data resulting from a HDMI communication protected by the HDCP protocol) in order to obtain an over-encrypted HDMI/HDCP signal which is called HDMI+. The format is the same as the original HDMI/HDCP but the audio/video data are further encrypted (i.e. over-encrypted). Contrarily to the HDMI/HDCP which has also a standard encryption layer by means of HDCP protocol, designed to exchange data with any device having the correct certificate, the HDMI+ layer is a proprietary encryption layer, namely a layer which cannot be decrypted without knowing the encryption mode used to generate this layer. In other words, the proprietary encryption is an encryption which is not standardized within the HDMI standard, in particular HDCP protocol. The HDMI+ stream is then sent to the display device TV through the HDMI input. The header of the packets sent according to this standard contains an indicator allowing the display device TV to redirect the stream to a dongle DG connected with the display device. This dongle does not need to be HDCP compliant.

According to one embodiment, the connector is a CI+ connector but the present invention is not limited to this solution.

We can also have a HDMI like dongle having an input and an output. The purpose of this dongle DG (connected to the CI+ port of another port) is to receive the HDMI+ stream and remove the proprietary encryption layer.

For that purpose, the dongle should contain the same key (or keys) as in the IRD. Different solutions exist to achieve this aim. The first method is based on a pre-initialization of the dongle with encryption key. This dongle has a unique number identifying it and thus allowing the management center to trace the use of the dongle. When the dongle is delivered to the client, a suitable message can be send to the client’s IRD to transmit, in a secure way, the corresponding key (or keys) that were previously loaded into the dongle. The dongle and the IRD are then paired and can only work together.

Another way to share the same key between the dongle and the IRD is to connect the dongle directly with the IRD. For that purpose, the IRD can use its HDMI connection already present in the dongle, or alternatively, use another connection such as USB, wifi or other. The dongle will then contain in addition to the HDMI input and output, a USB connection. During an initialization step, the IRD will read the unique number of the dongle, and start the generation of the communication key. Generation method such as Diffie-Hellman can be used.

At the end of the initialization, the IRD and the dongle are paired, i.e. contain the same key. The dongle acts as a bridge, receiving the encrypted HDMI+, remove the over-encryption layer thanks to the key previously loaded, and return the HDMI/HDCP stream to the display device.

The FIG. 4 is similar to the FIG. 3 with the difference that the HMDI+ stream is directly connected to the dongle DG. The function of the dongle is the same as before. The display device does not need to be modified to reroute the HDMI+ stream to the dongle. In this solution, the form factor plays an interesting role. The preferred solution is using another input than the standard HDMI input. The CI+ connection, as an example, gives a better protection against tampering the output of the dongle. The dongle DG, in case in the form of a CI+ card, can comprise an HDMI input and a HDMI output. The HDMI output in then connected to the standard HDMI input of the display device. The connector of the CI+ is essentially used to power the dongle. To this end, the dongle has the shape of a CI+ card and is powered by the CI+ Interface of the display device.

The way to load the decryption key into the dongle has been described and is also valid for this case.

The FIG. 5 illustrates another embodiment of the invention. In this case, the IRD is not HDMI+ compliant. This is why a converter box CC is added at the output of the IRD to convert the HDMI/HDCP to HMDI+. It is not necessary, for the converter box, to have a HDMI certificate since no decryption will by carried out in this module. The processing device simply detects the beginning of a packet (packet header) and over-encrypts the payload with the key common to the converter box and the dongle DG. The dongle executes the reverse function, i.e. removing this extra encryption layer thanks to the decryption key.

The difference between the FIGS. 5 and 6 is the same as the FIGS. 3 and 4. In a first example, the display device receives the HDMI+ stream and reroute it to the dongle. In the other example, the dongle receives directly the stream and, once decrypted, pass it to the display device.

The feedback connection between the converter box CC with the IRD can be used to check whether the HDMI link between these two devices was not modified. The converter box CC can extract randomly or on request of the IRD, a packet entering into the converter box, this packet being sent back to the IRD for verification. Instead of the packet, the converter box can send a signature (e.g. an Hash value) of it for comparison by the IDR. The IRD execute the same function to calculate the signature of the packet sent and compare the received signature with the one calculated. The IRD can then determine if the packet sent to the converter box is the same as the one received by the converter box and sent back. In case if discrepancy, the IRD can take suitable actions.

The FIG. 7 is similar to the other designs, the wire connection between the IRD and the display device being replaced by a wireless connection. The FIG. 7 illustrates an example in which the IRD contains wireless capabilities. The HDMI+ signal is sent and the dongle can receive this signal. Once decrypted, the dongle DG can pass it to the display device.

The FIG. 8 illustrates an embodiment in which the IRD comprises no wireless capabilities. In this case, the converter box already described above contains a wireless emitter to transmit the signal HDMI+.

The present invention also refers to a decoder such as a set-top-box or an Integrated Receiver Decoder IRD to prevent manipulation of transmitted video data. This decoder comprises means for receiving audio/video data and means for transmitting an HDMI/HDCP stream resulting from an HDMI compliant audio/video stream protected by an HDCP protocol. This decoder further comprises means to add an over-encryption layer to said HDMI/HDCP stream. Preferably, the over-encryption layer is a proprietary encryption layer which cannot be decrypted without knowing an encryption mode used to generate this over-encryption layer.

According to another embodiment, means for adding the over-encryption layer are lodged within a converter box comprising means to connect this box to the aforementioned means for transmitting the HDMI/HDCP stream.

The present invention also refers to a dongle DG for removing an over-encryption layer from an HDMI/HDCP stream resulting from an HDMI compliant audio/video stream protected by an HDCP protocol within a system for preventing manipulation of transmitted video data.

This dongle comprises an input which receives the over-encrypted HDMI/HDCP stream, an output to connect the dongle to a display device TV and a port for sending an encryption key and a unique identifier used for identifying the dongle DG.

In a first embodiment, the port is a wireless port. However, this port can also be a USB port.

The encryption key can be either stored in a memory or generated by a generator comprised into the dongle.

In another embodiment, the dongle has a shape of a CI+ card and is powered by a CI+ Interface of the display device TV.

The invention claimed is:

1. A system to prevent manipulation of transmitted video data, the system comprising:
- an Integrated Receiver Decoder (IRD) configured to receive audio/video data and to output the audio/video data within an HDMI/HDCP stream, the HDMI/HDCP stream being an HDMI compliant audio/video stream protected by an HDCP protocol layer;
- an encryption device configured to add an over-encryption layer to said HDMI/HDCP stream to obtain an over-encrypted stream, the over-encrypted stream being encrypted with the over-encryption layer and the HDCP protocol layer, the encryption device including a transmitter configured to transmit the over-encrypted stream, the encryption device being housed in a converter box that is external to the IRD;
- a decryption device configured to receive the over-encrypted stream and to remove the added over-encryption layer so as to recover said HDMI/HDCP stream; and
- a display device configured to receive and process the recovered HDMI/HDCP stream,
- wherein the converter box includes,
  - an extraction device configured to extract a packet from the HDMI/HDCP stream entering into the converter box, and
  - a feedback device configured to send a signature of the extracted packet to the IRD.

2. The system of claim 1, wherein said over-encryption layer is a proprietary encryption layer which cannot be decrypted without knowing an encryption mode used to generate the over-encryption layer.

3. The system of claim 1, wherein said decryption device is a dongle housed external to the IRD and the converter box, the dongle including,
- a receiver configured to receive the over-encrypted stream, and
- a transmitter configured to transmit the recovered HDMI/HDCP stream to the display device after the decryption device removes the over-encryption layer.

4. The system of claim 3, wherein the dongle has the shape of a CI+ card and is powered by a CI+ Interface of the display device.

5. The system of claim 3, wherein the connection between the IRD and the dongle is wireless.

6. The system of claim 1, wherein the connection between the external converter box and the decryption device is wireless.

7. The system of claim 1, wherein the signature is a hash value.

8. The system of claim 1, wherein the IRD is configured to determine whether a link between the IRD and the encryption device was modified based on the signature received from the feedback device.

9. The system of claim 1, wherein the extraction device is configured to extract the packet from the HDMI/HDCP stream before the encryption device adds the over-encryption layer to the packet.

10. A device to prevent manipulation of transmitted video data within a system, the device comprising:
- a receiver configured to receive audio/video data and to output the audio/video data within an HDMI/HDCP stream, the HDMI/HDCP stream being an HDMI compliant audio/video stream protected by an HDCP protocol layer;
- an encryption device configured to add an over-encryption layer to said HDMI/HDCP stream to obtain an over-encrypted stream, the over-encrypted stream being encrypted with the over-encryption layer and the HDCP protocol layer, the encryption device being housed in a converter box that is external to the receiver; and
- a transmitter configured to transmit the over-encrypted stream,
- wherein the converter box includes,
  - an extraction device configured to extract a packet from the HDMI/HDCP stream entering into the converter box, and
  - a feedback device configured to send a signature of the extracted packet to the receiver.

11. The device of claim 10, wherein said over-encryption layer is a proprietary encryption layer which cannot be decrypted without knowing an encryption mode used to generate the over-encryption layer.

12. A dongle for removing an over-encryption layer from an over-encrypted stream, the dongle comprising:
- an input configured to receive said over-encrypted stream from an Integrated Receiver Decoder (IRD), the over-encrypted stream being an HDMI compliant audio/video sly cam encrypted with an HDCP protocol layer and the over-encryption layer;
- at least one output configured to connect said dongle to a display device, wherein the at least one output is configured to send an encryption key and a unique identifier for identifying the dongle to an Integrated Receiver Decoder (IRD), the unique identifier pairing the dongle with the (IRD) to trace the use of the dongle.

13. The dongle of claim 12, wherein said port is a wireless port.

14. The dongle of claim 12, wherein said port is a USB port.

15. The dongle of claim 12, further comprising a memory configured to store at least said encryption key.

16. The dongle of claim 12, wherein the dongle has a shape of a CI+ card and is powered by a CI+ Interface of the display device.

* * * * *